(12) United States Patent
John Wilson et al.

(10) Patent No.: US 12,111,410 B2
(45) Date of Patent: Oct. 8, 2024

(54) TECHNIQUES FOR RADAR DATA COMPRESSION

(71) Applicant: QUALCOMM Incorporated, San Diego, CA (US)

(72) Inventors: Makesh Pravin John Wilson, San Diego, CA (US); Amin Ansari, San Diego, CA (US); Sundar Subramanian, San Diego, CA (US); Volodimir Slobodyanyuk, San Diego, CA (US); Radhika Dilip Gowaikar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 255 days.

(21) Appl. No.: 17/135,545

(22) Filed: Dec. 28, 2020

(65) Prior Publication Data

US 2021/0208236 A1    Jul. 8, 2021

Related U.S. Application Data

(60) Provisional application No. 62/957,018, filed on Jan. 3, 2020.

(51) Int. Cl.
| | |
|---|---|
| *G01S 7/00* | (2006.01) |
| *G01S 7/03* | (2006.01) |
| *G01S 7/292* | (2006.01) |
| *G01S 7/35* | (2006.01) |
| *G06N 3/08* | (2023.01) |
| *G07C 5/00* | (2006.01) |

(52) U.S. Cl.
CPC ............ *G01S 7/003* (2013.01); *G01S 7/03* (2013.01); *G01S 7/2922* (2013.01); *G01S 7/354* (2013.01); *G06N 3/08* (2013.01); *G07C 5/008* (2013.01)

(58) Field of Classification Search
CPC .......... G01S 7/003; G01S 7/03; G01S 7/2922; G01S 7/354; G06N 3/08; G07C 5/008
See application file for complete search history.

(56) References Cited

U.S. PATENT DOCUMENTS

| | | | | |
|---|---|---|---|---|
| 11,577,722 | B1 * | 2/2023 | Packer | B60W 30/0956 |
| 11,804,050 | B1 * | 10/2023 | Milletari | G06N 3/063 |
| 2005/0024236 | A1 * | 2/2005 | Gosdin | G08G 5/0091 |
| | | | | 348/E7.071 |
| 2015/0346321 | A1 * | 12/2015 | Jansen | G01S 7/02 |
| | | | | 342/107 |
| 2017/0031013 | A1 * | 2/2017 | Halbert | G01S 7/414 |
| 2017/0054449 | A1 * | 2/2017 | Mani | H03M 7/4031 |

(Continued)

*Primary Examiner* — Timothy A Brainard
*Assistant Examiner* — Kenneth W Good
(74) *Attorney, Agent, or Firm* — Polsinelli

(57) ABSTRACT

According to some aspects of the disclosure, techniques for compression techniques for the radar data that can be used in real-time applications for automated or self-driving vehicles. One or more compression techniques can be selected and/or configured based on information regarding operational conditions provided by a central (vehicle) computer. Operational conditions can include environmental data (e.g., weather, traffic), processing capabilities, mode of operation, and more. Compression techniques can facilitate transport of compressed radar data from a radar sensor to the central computer for processing of the radar data for object detection, identification, positioning, etc.

30 Claims, 6 Drawing Sheets

(56) References Cited

U.S. PATENT DOCUMENTS

| | | | | |
|---|---|---|---|---|
| 2019/0041494 A1* | 2/2019 | Roger | ...................... | G01S 7/352 |
| 2019/0317205 A1* | 10/2019 | Meissner | ............ | H03M 7/3059 |
| 2020/0150220 A1* | 5/2020 | Maor | ...................... | G01S 7/038 |
| 2021/0072372 A1* | 3/2021 | Mlinar | .................. | G01S 7/2922 |
| 2021/0166052 A1* | 6/2021 | Park | ...................... | G06V 10/757 |
| 2021/0370925 A1* | 12/2021 | Janssen | ................ | B60W 10/04 |
| 2022/0398456 A1* | 12/2022 | Gao | ...................... | G06V 10/454 |

* cited by examiner

TECHNIQUES FOR RADAR DATA COMPRESSION

CROSS-REFERENCE TO RELATED APPLICATION(S)

This application claims priority to and incorporates by reference commonly-owned U.S. Patent Application Ser. No. 62/957,018, filed Jan. 3, 2020, entitled "Compression Techniques For Automotive Radars," in its entirety and for all purposes.

BACKGROUND

Radar sensors can be installed in automated or self-driving vehicles. Improvements in radar technology (e.g., elevation steering, increased range, and improved angular resolution) have dramatically increased the amount of raw radar data generated by the radar sensors to use in such automotive applications. Transporting the increased amount of raw data from the sensors to the computational/processing blocks of the radar system for processing can be difficult due to limited bandwidth for transporting data to processing sensors in the radar and vehicle systems.

BRIEF SUMMARY

According to some aspects of the disclosure, techniques for compression techniques for the radar data that can be used in real-time applications for automated or self-driving vehicles. One or more compression techniques can be selected and/or configured based on information regarding operational conditions provided by a central (vehicle) computer. Compression techniques can facilitate transport of compressed radar data from a radar sensor to the central computer for processing of the radar data for object detection, identification, positioning, etc.

An example method of compressing radar data in a radar system of a vehicle, according to this disclosure, comprises receiving, at the radar system, information from a mobile computer system regarding one or more operational conditions regarding the vehicle, and determining one or more parameters for radar data compression based at least in part on the one or more environmental conditions. The method also comprises performing a radar scan with the radar system to obtain radar data, and compressing the radar data using a compression technique, where the compression technique is performed in accordance with the one or more parameters. The method also comprises sending the compressed radar data from the radar system to the mobile computer system.

An example device, according to this disclosure, comprises a transceiver, a memory, and one or more processing units communicatively coupled with the transceiver and the memory. The one or more processing units configured to receive, via the transceiver, information from a mobile computer system regarding one or more operational conditions regarding a vehicle. The one or more processing units are further configured to determine one or more parameters for radar data compression based at least in part on the one or more environmental conditions, and perform a radar scan with the transceiver to obtain radar data. The one or more processing units are further configured to compress the radar data using a compression technique, where the compression technique is performed in accordance with the one or more parameters, and send the compressed radar data from the device to the mobile computer system.

Another example device, according to this disclosure, comprises means for receiving information from a mobile computer system regarding one or more operational conditions regarding a vehicle. The device also comprises means for determining one or more parameters for radar data compression based at least in part on the one or more environmental conditions, and means for performing a radar scan to obtain radar data. The device also comprises means for compressing the radar data using a compression technique, where the compression technique is performed in accordance with the one or more parameters, and means for sending the compressed radar data to the mobile computer system.

An example non-transitory computer-readable medium, according to this disclosure, stores instructions for compressing radar data in a radar system of a vehicle. The instructions comprise code for receiving, at the radar system, information from a mobile computer system regarding one or more operational conditions regarding the vehicle, and determining one or more parameters for radar data compression based at least in part on the one or more environmental conditions. The instructions also include code for performing a radar scan with the radar system to obtain radar data, and compressing the radar data using a compression technique, where the compression technique is performed in accordance with the one or more parameters. The instructions also include code for sending the compressed radar data from the radar system to the mobile computer system.

These and other embodiments are described in detail below. For example, other embodiments are directed to systems, devices, and computer readable media associated with methods described herein. A better understanding of the nature and advantages of embodiments of the present disclosed may be gained with reference to the following detailed description and the accompanying drawings.

Figure 1:
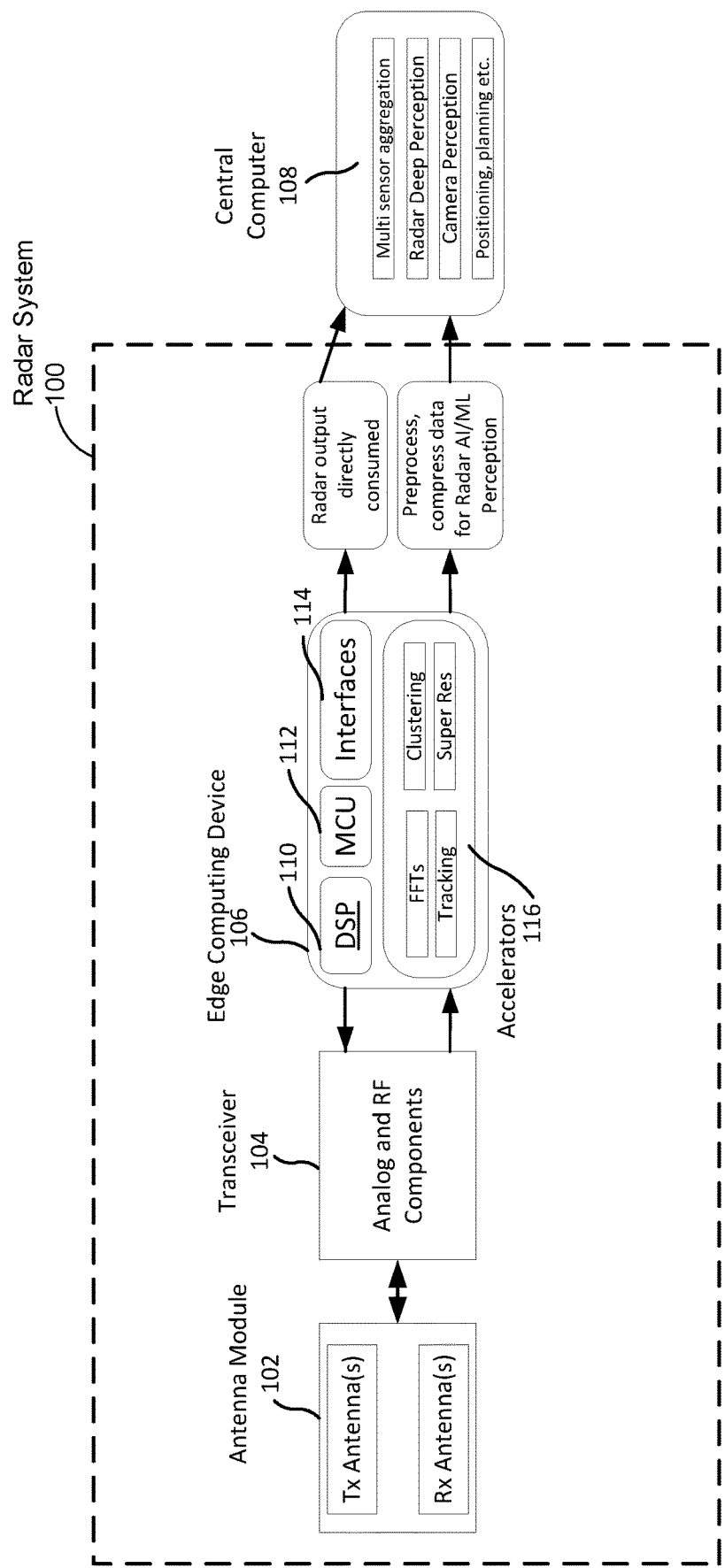
FIG. 1 is a block diagram of a radar sensor system that can be used to implement the techniques for providing radar data compression, according to an embodiment.

Like reference, symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION OF THE DRAWINGS

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Radar sensors can perform scans to provide imaging in automotive and other applications. Scans can be taken, for example, across different elevations, estimates, ranges, and/or Doppler to provide a 3D map of Channel Impulse Responses (CIRs) of scanned areas, which can provide more information and may be more robust in adverse conditions (e.g., adverse lighting and/or weather conditions) than traditional cameras. Radar scans can therefore provide valuable information that can complement existing automotive systems. For example, data from one or more radar scans can be used by an automobile to correct simultaneous localization and mapping (SLAM) information, correct object detection, and more, which may be used for automated driving systems, navigation, and/or other functions.

Embodiments provided herein describe one or more techniques for radar data compression, which can be used in automotive and other applications. In various embodiments, the radar system can receive information on available bandwidth of one or more radar interfaces and a traffic scenario. The techniques can include converting the received radar signals info a plurality of radar data. Based on the available bandwidth and the traffic scenario, one or more compression techniques can be selected to achieve the desired compression level at an acceptable processing time with an acceptable level of resolution of the radar data for the traffic scenario. The compressed techniques can include dimensional collapse, various sampling techniques, statistics based techniques, constant false alarm rate (CFAR) based techniques, and various deep learning approaches. The compressed data can be sent via one or more interfaces to the mobile computer system for further processing. In some embodiments, the mobile computer system can perform processing on the compressed radar data. In other embodiments, the compressed radar data will be decompressed prior to further processing.

The mobile computer system can use the output data for implementation of deep learning techniques. The deep learning techniques enable the vehicle to identify and classify detected objects for use in automated driving processes. The compression techniques can be implemented in analog and/or digital circuitry.

FIG. 1 is a simplified drawing of a radar sensor system 100 that can be used to implement the techniques for providing data compression as described herein below, according to an embodiment. As noted, the radar sensor system 100 can be installed in a vehicle end used in automotive applications. (Although automotive embodiments are described herein, embodiments are not so limited. A radar system 100 may be used in other applications.) The radar system 100 can be used to detect the location and/or speed one or more objects in the vicinity of a vehicle (e.g., in front, behind, or to either side of the vehicle). In the automotive context, the radar system 100 can detect objects such as vehicles, motorcycles, bicycles, pedestrians, etc. The radar system 100 therefore can be used, for example, in autonomous vehicles, semi-autonomous vehicles (e.g., vehicles equipped with Advanced Driver-Assistance Systems (ADAS)), and the like. In some embodiments, the radar system 100 may be integrated into a single radar sensor located on a vehicle. Moreover, a vehicle may have more than one such radar sensors, which may provide radar sensing in multiple directions around the vehicle.

Put generally, the radar system 100 can perform a scan by transmitting and receiving radar signals across different elevations, estimates, ranges, and/or Doppler. A scan may be used to create a 3D map of CIRs of a scanned area. Often a Fast Fourier Transform (FFT) is used as a distance estimate technique for detecting objects. The peaks of the FFT can correspond to objects detected and the frequencies of the peaks can correspond to the distances of the objects. Using these techniques, the minimum distance to resolve two objects and determine their respective distances is known as the Rayleigh limit, or $c/2B$, where c is the speed of light and B is the bandwidth of the radar signal. The limits to Doppler resolution of a radar system depend on maximum dwell time of a radar system that is inversely proportional to total time. The limits of azimuth or elevation resolution are inversely proportional to aperture size of the radar antenna or antenna configuration. These limits on resolution can, for example, prevent the radar system 100 from identifying two objects are spaced closely together because the larger object can tend to hide the smaller object. The radar system 100 can, however, perform super-resolution processing to overcome these limits on resolution.

The radar system 100 can have multiple components including an antenna module 102, a transceiver 104, an edge computing device 106, and a central computer 108. The edge computing device 106 can include one or more digital signal processors (DSPs) 110, a microcontroller 112 (also known as a microcontroller unit (MCU)), one or more interfaces 114, and one or more accelerator components 116. The various components can be communicatively connected via wired and/or wireless communications. FIG. 1 is a notional drawing and the various components can be configured as a single form-factor device or can be combined as various different devices. In some embodiments, the antenna module 102, the transceiver 104, and the edge computing device 106 can be positioned in close proximity for high-data throughput. In these embodiments, the central computer 108 can be located in a different area of the vehicle where there can be additional space.

The antenna module 102 can be used for both transmitting and receiving the radar signals. In some embodiments, antenna module 102 may comprise two separate antennas or sets of antennas, as illustrated, which can be used for transmitting the radar signals ("Tx antenna(s)") and for receiving the radar signals ("Rx antenna(s)"). Radar signals transmitted by the Tx antenna(s) of the antenna module 102 can reflect off of nearby objects and be received by the Rx antenna(s) of the antenna module 102. The received radar signals can then be sent from the antenna module 102 as radar data to the transceiver 104 (e.g., via physical wiring). In various embodiments, the Tx antenna(s) can include multiple antenna components to form an antenna array, and/or the Rx antenna(s) can include multiple antenna components to form an antenna array. In this way, the Rx and/or Tx antenna arrays can be used to employ the beamforming techniques described below.

The transceiver 104 is a component capable of both transmitting and receiving radar signals. The transceiver 104 can include various analog and digital RF components. The transceiver 104 can include transmitter and/or receiver components, which may include transmitter and receiver components on a single chip (integrated circuit or IC), or on separate chips. Received data from the transceiver 104 can be sent for processing to the edge computing device 106. The transceiver 104 can send electronic signals to the antenna module 102 that result in generation of radar signals that are transmitted by the antenna module 102 in the manner previously described. As noted, the transceiver 104 can receive radar data from the antenna module 102 following the reception of corresponding radar signals at the antenna module 102.

Depending on desired functionality, the radar system 100 may use continuous-wave (CW) radar and/or pulse radar systems. Continuous-wave (CW) radar transmits and receives at the same time. The transmitter generates a continuous sinusoidal oscillation at frequency $f_t$ that is radiated by the antenna. On reflection by a moving target, the transmitted signal is shifted via the Doppler effect by an amount $f_d$. It is also possible to measure range using a CW radar system by frequency modulation, or digital modulation techniques such as phase shift keying (PSK). A systematic variation of transmitted frequency or phase places a unique time stamp on the transmitted wave at every instant. By measuring the frequency or phase of the received signal, the time delay between transmission and reception can be measured and therefore the range can be measured. An equation for the calculation of range is as follows:

$$R = c\frac{T}{2}\frac{\Delta f}{f_2 - f_1},$$

where c is the speed of light, $\Delta f$ is the difference between the transmitted and received signals, $f_2$ is the maximum transmitted frequency, $f_1$ is the minimum transmitted frequency and T is the period between $f_1$ and $f_2$, and the velocity is given by the following equation:

$$v = \frac{dR}{dt}.$$

A pulse radar (or pulse Doppler radar) has the advantage of being able to detect small amplitude moving target returns against a large amplitude clutter background. Pulse-delay ranging is based on the measurement of the time delay between the transmitted pulse and the received echo and is provided by the following equation:

$$R = c\frac{\Delta T}{2},$$

where c is the speed of light, $\Delta T$ is the time difference between transmitted and received pulse and echo.

The velocity is related to the Doppler frequency shift between the transmitted pulse and received echo as provided by the equation:

$$v = \frac{f_d \lambda_0}{2},$$

where $f_d$ is the Doppler frequency shift and $\lambda_o$ is the free space wavelength at the center frequency.

Pulse Doppler radars are half-duplex, meaning that they either transmit or receive, which results in high isolation between the transmitter and receiver, thus increasing the dynamic range of the receiver and the range detection of the radar. The disadvantage of this system is the existence of a blind zone given by the following equation:

$$R_b = c\frac{(\tau_p + t_s)}{2},$$

where $\tau_p$ is the pulse width, and $t_s$ is the switching time of the transmit and receive switch, if applicable. Pulse Doppler radar systems are therefore better suited for long-range detection, whereas frequency-modulated continuous wave (FMCW) radar is better suited for short-range detection. In one embodiment, a pulse-modulated waveform can be used that is full duplex.

Based on a command signal from the edge computing device 106, the transceiver 104 can generate a series of radar pulses transmitted by the antenna module 102. One or more transmitted radar signals can reflect off one or more objects within a scanned area and reflected radar signals (or radar return) be received by the antenna 102, as noted. Radar data indicative of the received radar signals can be sent to the transceiver 104. In the transceiver some pre-processing (amplification, etc.) can be performed on the radar data. The radar data can then be passed to the edge computing device 106, which can perform additional processing of the radar data.

The edge computing device 106 can include one or more accelerator elements 116. The accelerator elements 116 can include one or more hardware components or software (e.g., firmware) routines that can perform processing on the radar data received from the transceiver 104. In some embodiments, the accelerator elements 116 can be incorporated into a chip comprising the transceiver 104 or included as one or more chips proximate thereto. In some embodiments, can be incorporated into a DSP 110 and/or microcontroller 112 of the edge computing device 106, or included as one or more chips proximate thereto. The one or more accelerator elements 116 may be configured to process the radar data by performing Fast Fourier Transform (FFT), clustering, tracking, and/or super-resolution on the radar data. As used herein, the terms "pre-processing, "pre-processing techniques," and variations thereof refer to processing performed on the radar data prior to super-resolution processing. As indicated in FIG. 1, accelerators 116 may comprise components configured to perform such pre-processing and/or super-resolution. Additional details regarding these processes are provided hereafter.

The edge computing device 106 can also include one or more DSPs 110. The DSP 110 may comprise a special purpose or general purpose processing unit configured to perform various signal processing functions using hardware and/or software means. As such, the DSP 110 may comprise an Application-Specific Integrated Circuit (ASICs) or a specialized microprocessor (or a System in a Package (SiP) block) chip, with its architecture optimized for the operational needs of digital signal processing. DSP 110 may use special memory architectures and/or may implement data compression technology.

The edge computing device 106 can also include a microcontroller 112. The microcontroller 112 may comprise one or more processor cores along with memory and programmable input/output peripherals. Program memory in the form of ferroelectric RAM, NOR flash or one time programmable (OTP) ROM is also often included in the microcontroller 112, as well as a small amount of RAM.

One or more interfaces 114 can enable the edge computing device to communicate data between the radar system 100 and a central computer 108. This data can include, for example, output from super-resolution processing of radar data as described above. According to some embodiments, the central computer 108 can then perform additional operations (e.g., compress the data for radar artificial intelligence/machine learning perception, as shown in FIG. 1) of the data received from the radar system 100. In the central computer 108, multiple operations can be performed including but not limited to multi-sensor aggregation, radar deep perception, camera perception, and positioning and planning. An embodiment of a central computer 108 may comprise a mobile computer system as discussed in greater detail below with respect to FIG. 5.

As noted, one or more radar sensors (each comprising a radar system 100) can be used in modern-day vehicles. However, because radar sensors capture a very large amount of data (e.g., exceeding 10 Gbps), transporting data between components within a radar sensor and/or from the one or more sensors to the central computer 108 can be difficult due to bandwidth constraints. On the other hand, it can be important to preserve enough data to allow the central computer 108 to make intelligent decisions based on data from radar sensors (and potentially other sensors). Embodiments described herein provide for compression techniques to that can address these and other concerns.

Figure 2:
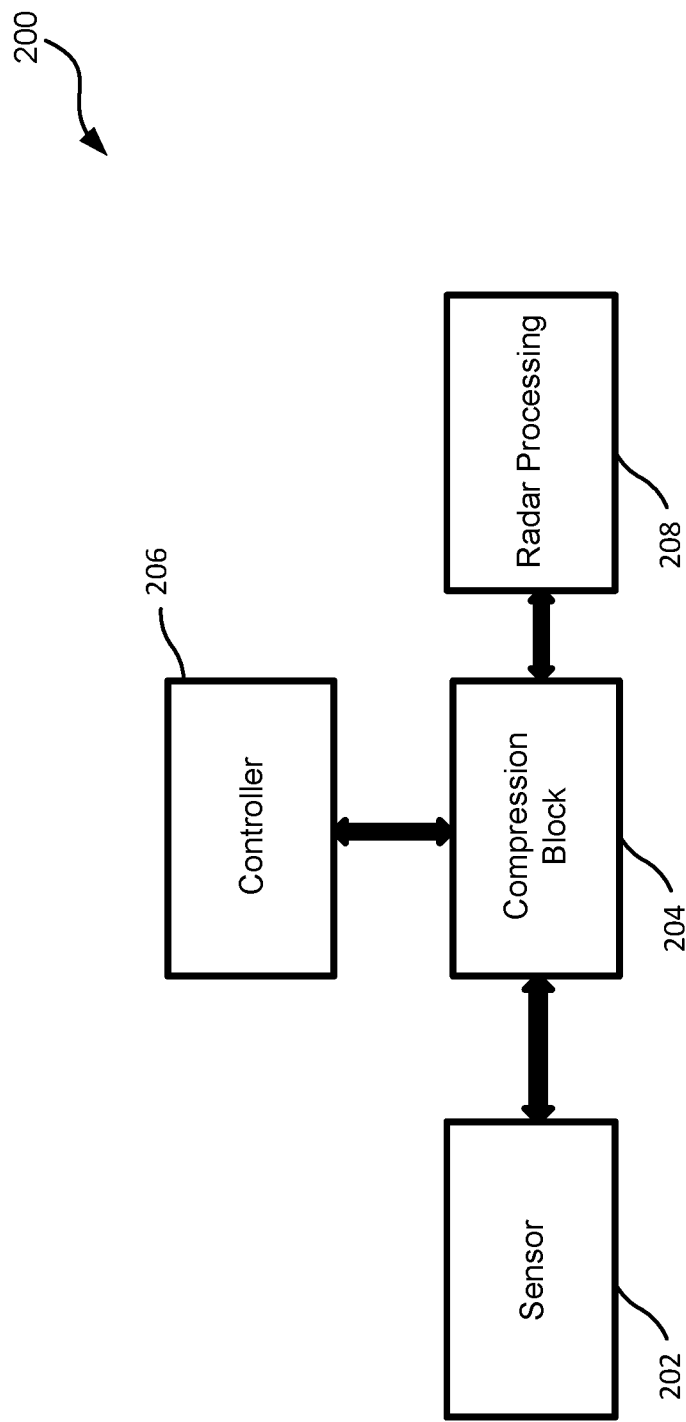
FIG. 2 is a block diagram of a system for compressing of radar data, according to an embodiment.

FIG. 2 is a block diagram of a system 200 for compressing of radar data, according to an embodiment. The operations shown in one or more of the blocks of the system 200 may be performed by one or more components of a radar system 100 illustrated in FIG. 1 using hardware and/or software. Put differently, the blocks in block diagram of FIG. 2 illustrate a functional representation of an embodiment of a system that may be used to compress of radar data as described herein, and FIG. 1 may show an implementation of such a system.

A sensor block 202 as used by the system 200 to obtain radar data in the manner previously described in relation to FIG. 1 by transmitting and receiving radar signals. The sensor block 202 therefore may comprise antenna module 102, transceiver 104, and one or more aspects of edge computing device 106 (e.g., microcontroller 112). The radar data can be sent from the sensor block 202 to the compression block 204.

Generally put, the compression block 204 compresses the radar data received from the sensor block 202 in accordance with the configuration received from the controller 206, and provides the compressed data to the radar-processing block 208. The compression block 204 can comprise components of a radar system 100 capable of compressing the radar data. As such, the compression block 204 may comprise one or more components of an edge computing device 106, such as DSP 110 and/or specialized hardware, which may be incorporated into accelerators 116.

The controller 206 may also comprise one or more components of an edge computing device 106, such as the microcontroller 112. As noted, the controller 206 may configure the compression block 204. This can enable embodiments to dynamically configure the way in which to radar data is compressed, depending on a given situation. The controller 206 can configure the compression block 204 based on one or more factors to implement one or more different modes of operation. These different modes of operation can be chosen based on bandwidth limitations, current traffic conditions, etc.

According to some embodiments, the controller 206 may configure compression block 204 to implement a mode of operation based on environmental factors of the vehicle, such as location, traffic conditions, etc. For example, in a highway mode (e.g., when the vehicle is on a highway or freeway), a high degree of compression to quickly identify a relatively low number of objects near the vehicle within the radar data. In urban mode, there may be a higher number of radar targets (e.g., other vehicles and pedestrians) and a higher likelihood of collision thus, a lower level of compression may be used to provide for increased resolution of the radar data. The controller 206 can configure the compression block 204 to operate in the highway mode or the urban mode (or some other mode), based on relevant information (e.g., a speed and/or location of the vehicle, environmental conditions of the vehicle, detected or anticipated processing capabilities of the radar processing block 208, etc.). This information may be provided to the controller 206 by the central computer 108.

Additionally or alternatively, the controller 206 may configure the compression block 204 for in accordance based on a mode of operation for the radar sensor. For example, a radar sensor (comprising radar system 100) may operate in long-range radar (LRR) mode, medium range radar (MRR), and/or short-range radar (SRR) modes of operation. Again, the controller 206 may configure the compression block 204 to implement a corresponding (optimal) mode of compression.

According to some embodiments, the compression block 204 may additionally or alternatively be configured based on radar data requirements of downstream components that perform radar processing (in radar processing block 208). For example, according to some embodiments, radar processing may be performed by a central computer 108, which may implement deep learning algorithms (e.g., convolutional neural networks (CNNs), point-based networks, etc.) to identify objects and/or perform other processing of the radar data, and radar. The compression block 204 therefore may be configured to accommodate any requirements of these deep learning algorithms. According to some embodiments, such accommodations may comprise outputting a fixed number of data points (e.g., outputting a fixed number of data points per scan). This can be the case, for example, if the radar processing block 208 comprises a point-based networks, which may require a fixed number of data points. Alternatively, in some embodiments, the parameters can be expressed as a variable number of points. The variable number of points can be in some examples due to selecting points that exceed a pre-determined threshold. Additional details regarding how data may be added or dropped to the compressed data (provided by the compression block 204 to the radar processing 208) to meet a fixed number of data points are provided hereafter.

The radar-processing block 208 may comprise software and/or hardware components (e.g., deep learning algorithms, vehicle control systems, radar deep perception, etc.) that can process the compressed data for object detection, position determination, identification, tracking, in the like. The output of the radar processing may comprise, for example, a location, speed, and/or type of one or more detected objects, which may be used in automotive applications to assist in automated or semi-automated driving and/or other ADAS functions. According to some embodiments, some or all aspects of the radar processing block 208 can be executed by the central computer 108 as shown in FIG. 1.

Figure 3:
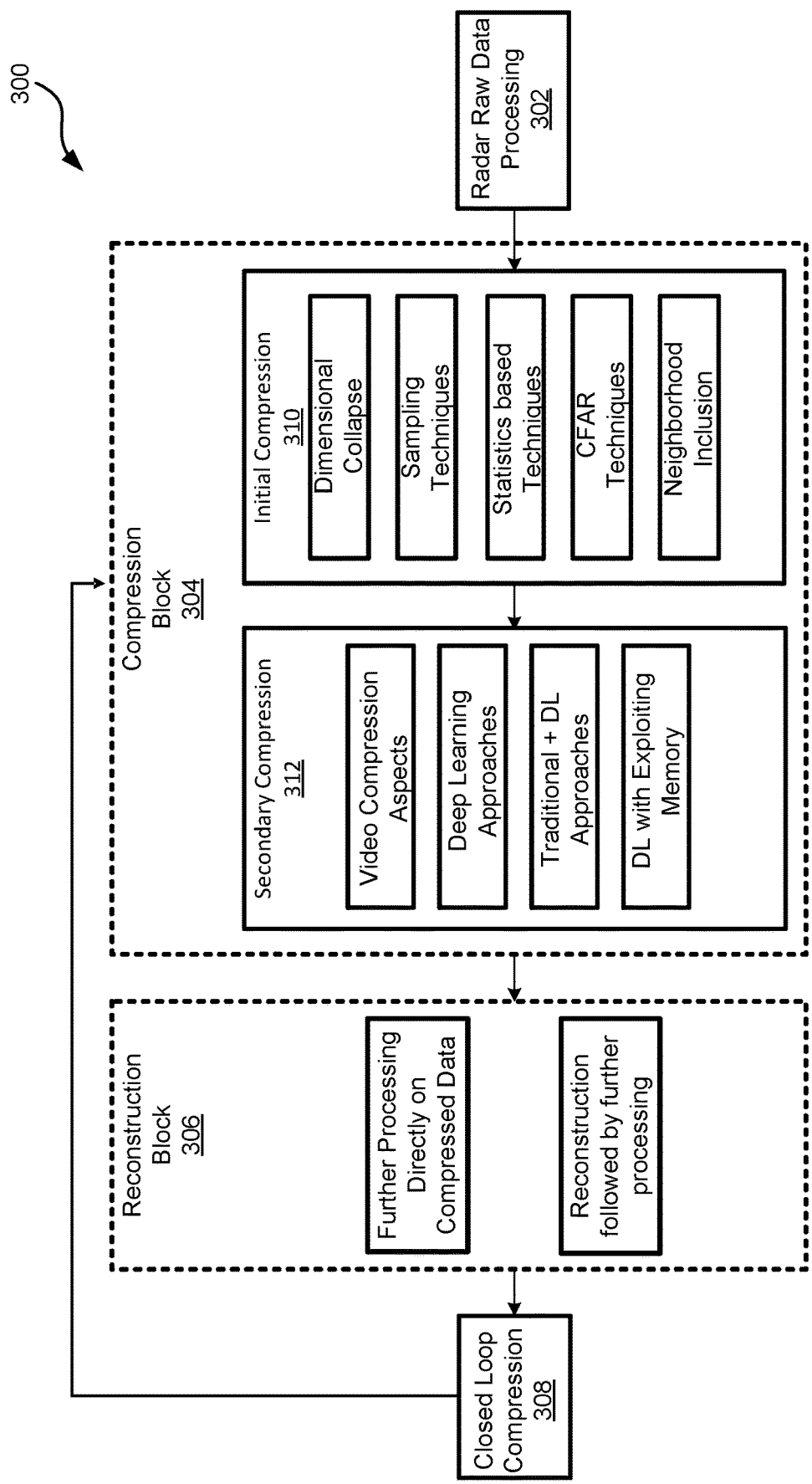
FIG. 3 is a block diagram of a system for compressing of radar data, according to another embodiment.

FIG. 3 is a block diagram of a system 300 for compressing of radar data, according to another embodiment. Similar to FIG. 2, the operations shown in one or more of the blocks of the system 300 may be performed by one or more software and/or hardware components of a radar system, such as the radar system 100 illustrated in FIG. 1. Put differently, the blocks in block diagram of FIG. 3 illustrate a functional representation of an embodiment of a system that may be used to compress of radar data as described herein, and FIG. 1 may show an implementation of such a system.

The radar raw processing 302 may comprise any processing of raw radar information received by one or more Rx antennas to prepare the information for compression by compression block 304. Raw radar processing 302 may be performed, for example, by various components of a radar system, such as a transceiver 104 and/or aspects of an edge computing device 106, (e.g., DSP 110 and/or accelerators 116) of the radar system 100 shown in FIG. 1.

The compression block 304 may comprise hardware and/or software components capable of compressing the data using any of a variety of techniques, as illustrated in FIG. 3. This may include, for example, one or more compression techniques using an initial compression 310 followed by one or more compression techniques using a secondary compression 312. (Embodiments are not so limited, however, and any combination of one or more compression techniques in either/both initial compression 310 and secondary compression 312 may be used.)

Broadly put, the compression block 304 compresses the data (using one or more compression techniques) to facilitate the transport of data from a radar sensor (e.g., comprising radar system 100) to a receiving device (e.g., central computer 108). The compressed data can then be reconstructed at the receiving device using a reconstruction block 306 to perform one or more reconstruction techniques, and processed to derive object information (e.g., type, location, speed, etc.) as previously described. The functionality of the compression block 304 may be performed, for example, by an edge computing device 106 (e.g., including DSP 110 and/or accelerators 116).

As illustrated, some embodiments may employ closed loop compression 308, which allows a receiving device to provide information back to the compression block 304 (which may be configured using a controller, as indicated in FIG. 2). This allows the system 300 to further ensure a compression block 304 is configured optimally, based on the results of reconstruction at a receiving device.

The configuration of the compression block 304 and system 300 (and configuration in other embodiments described herein) may comprise selecting one or more techniques by which to compress radar data (e.g. from radar raw data processing 302). Configuration may further comprise providing parameters to use for the compression. These parameters may vary, depending on compression type, and may include, for example, a size (e.g., fixed or variable number of data points) for compressed data, one or more threshold values, values configuring neighborhood size for CFAR compression, etc. As noted, embodiments may provide these parameters dynamically, to adapt to dynamic conditions. This dynamic adaptability may be enabled, for example, by the closed loop compression 308 of the system 300. Additional information regarding various compression types (an parameters used by the compression types) are provided hereafter.

Radar data can include different dimensions such as range, azimuth, elevation, and Doppler from the radar sensor. Dimensional collapse is a compression technique that selects a dimension of the radar data (e.g., Doppler information). According to some embodiments, for instance, the Doppler information can be reduced to a single value for that dimension. Other dimensions can be selected (additionally or alternatively) for dimensional collapse. For example, for each and azimuth value the maximum Doppler value can be selected for the radar data. In an example three dimensional grid there may be 128 Doppler bins corresponding to a range of 50 meters and an azimuth of 10°. Using dimensional collapse, radar data can be collapsed to one bin with a value of, for example, the maximum data (e.g., four meters per second) Doppler value. In some embodiments, the dimensional collapse can be achieved by selecting a fixed Doppler bin (e.g., the zero Doppler bin). This technique reduces the amount of radar data that needs to be sent to the mobile computer system for further processing. Parameters used for configuring the compression block 304 to perform dimensional collapse can include which dimension(s) to collapse and which values to use when doing so.

In the system 300 illustrated in FIG. 3, the sampling techniques in compression block 304 may comprise compression techniques performed by sampling certain regions. For example, in driving situations, the areas directly in front of the vehicle and to the immediate left and right of the vehicle can be the most important areas of radar information. Even for targets in front of the vehicle, a target directly in front of the vehicle, within a few meters, may be more important than targets a significant distance away to either side. According to this technique, high compression ratios can be used for data at long ranges from the vehicle and lower compression at shorter ranges from the vehicle. In this way, the shorter distance data will retain higher data and better resolution than the radar data at longer ranges that can be less critical to the safe operation of the vehicle. Parameters used for configuring sampling techniques, therefore, may include values indicating different regions (e.g., volumes defined by azimuth, elevation, range), a compression ratio for each region, and the like.

Additionally or alternatively, sampling techniques may be based on a configurable threshold. According to some embodiments, such sampling may comprise reducing the radar radar data by removing values that fail to meet a threshold intensity value, Signal-to-Noise Ratio (SNR), and/or Signal-to-Cluster-Noise Ratio (SCNR). For SCNR, a threshold value may vary from cluster to cluster within the radar data. Parameters used for configuring these forms of sampling techniques may comprise the thresholds themselves, values for defining clusters, and the like.

Statistics based techniques comprise data compression techniques that compress radar data based on a statistical analysis of the data. For example, a radar scan may result in radar data processing 302 providing the compression block 304 with a large number of radar data samples. According to some embodiments, the compression block 304 can then calculate a median of the intensity values for all or a portion of the data samples, and samples can be selected based at least in part on an intensity value greater than or equal to a multiple of median threshold value (e.g., five times the median value). Additionally or alternatively, statistics based techniques may set a statistical value of a threshold intensity percentile (e.g., 90th percentile). Parameters used for configuring statistics based techniques, therefore, can include a statistic type (e.g., median or percentile), threshold percentile, multiplier (e.g., to set a threshold based on the median value), etc.

The compression block 304 additionally or alternatively may compress radar data using CFAR compression. CFAR compression can include cell-averaging CFAR (CA-CFAR) and/or ordered statistic CFAR (OS-CFAR), for example, and may involve compressing N dimensions (2D compression, 3D compression, etc.). In CFAR compression, a threshold level may be determined by estimating a noise floor around given data point, by taking a block of neighboring points around the given data point and calculating the average power level. For example, in a selected range/azimuth bin (e.g., 35 meters at 5°), CFAR techniques evaluate the intensity at that point and pick neighboring block of points around the selected point (which can utilize "guard cells" by ignoring points immediately adjacent to the selected point). The power can be evaluated by taking the square of the intensity value. If the power (or intensity value) of the point of interest exceeds the threshold, the point of interest can be included in the compressed data. Otherwise, it can be excluded. Parameters used for configuring CFAR can include parameters defining neighboring blocks of points, for example.

Another compression technique comprises neighborhood inclusion. In this compression technique, a neighborhood of points (e.g., over a range, an azimuth, a Doppler value) around a value that exceeds a threshold can be included to add richness features. This can be particularly helpful for downstream processes that may utilize neighboring points to help identify objects. For example, a deep learning algorithm that processes radar data may not be able to distinguish a vehicle from other targets if only a few data points regarding the vehicle are included. However, by adding a neighborhood around the points, the deep learning algorithm may be more accurate in identifying targets. Parameters used for configuring neighborhood inclusion compression may include, for example, a range of neighboring points within one or more dimensions of the radar data.

As indicated in the system 300 of FIG. 3, radar data may undergo secondary compression 312 after performing initial compression 310 using one or more of the initial compression techniques described above. Alternatively, depending on desired functionality, the compression block 304 may utilize one or more of the secondary compression techniques illustrated in FIG. 3 without using an initial compression technique, or may use one or more initial compression techniques without using secondary compression. Again, the combination of compression techniques used in compression block 304 a vary, depending on desired functionality and/or situation-specific circumstances.

With regard to secondary compression techniques, video compression aspects may be used on radar data. That is, radar data may be encoded using one or more video codecs or compression standards to compress the radar data by encoding it. When reconstructed (e.g., at the central computer 108), the reconstruction block 306 may utilize a corresponding decoder to decode the radar data. Example video codecs include H.264, VP8, RV40, and the like. Parameters for video compression may include, for example, a video codec to use, and one or more compression rates (e.g., bit rates).

As illustrated in FIG. 3, compression block 304 may utilize deep learning approaches to compression. As previously noted, a central computer 108 may utilize deep learning (e.g., CNNs, point-based networks, etc.) to process radar data (after reconstruction). However, deep learning additionally or alternatively may be used in the compression of the radar data. Here, deep learning techniques may include, for example, auto encoders (e.g., variation auto-encoders, denoise auto-encoders, and/or variations thereof). As a person of ordinary skill in the art will recognize, auto-encoders can utilize multiple neural network layers to significantly encode (compress) data. This aspect of auto encoding can be performed by compression block 304. In such embodiments, the reconstruction block 306 may be used to decode (reconstruct) the radar data in accordance with auto encoding techniques, again utilizing neural networks. Parameters for deep learning approaches may include, for example, a type of auto-encoder to use, weights and/or other values for neural networks, and the like.

As further noted in FIG. 3, compression block 304 may utilize a combination of deep learning and other approaches, such as traditional approaches and exploiting memory. As an example, the compression block 304 may compress incoming radar data utilizing CFAR in conjunction with an auto-encoder. Deep learning with exploiting memory can include, for example, the use of Long Short-Term Memory (LSTM) and/or a Gated Recurrent Units (GRU) in a recurrent neural network (RNN), tension-based techniques, or the like.

The reconstruction block 306 may comprise further processing directly on compressed data, or reconstruction followed by further processing. Depending on the type of compression used by compression block 304 and/or processing technique used the process the radar data (e.g., at the central computer 108), reconstruction may be performed. As noted, reconstruction may involve decoding radar data encoded using video compression, auto-encoding, etc. The determination of whether to reconstruct data can additionally or alternatively be based on considerations such as desired accuracy, processing capabilities, etc.

As noted, the closed-loop compression 308 can inform the compression at compression block 304, informing which compression technique(s) to use and/or what parameter(s) to use. As discussed, the type of reconstruction used in reconstruction block 306 can also depend on type of compression used by compression block 304. The feedback provided by the closed-loop compression 308 can vary the type of compression used at compression block 304 based on any of a variety of factors (referred to herein as operational conditions), such as desired accuracy, detected or predicted processing capabilities (e.g., at the central computer 108), a processing type (e.g., a type of deep learning algorithm), environmental conditions that can affect radar data, etc. For example, in heavy traffic or inclement weather scenarios the compression techniques can be varied to achieve the desired resolution from one or more radar sensors. The compression techniques can also be varied based on the mode of the sensor (e.g., long-range detection mode versus medium range detection mode). If there is a high-risk scenario or other scenario that might need additional, more detailed data (such as during lane changes or other vehicle maneuvers) an amount of data compression may be reduced to help preserve resolution in such scenarios, which can impact the safety of passengers within the vehicle.

Generally put, higher compression may require more processing power and/or may reduce resolution. Moreover, it will be understood that each technique that can be used by the compression block 304 can provide one or more compression ratios. Embodiments can balance trade-offs between performance, resolution, compression, etc. to best accommodate the requirements of a given situation. Available bandwidth may also be used to determine the compression technique. A radar sensor may be communicatively coupled with a central computer 108 via a controller areas network (CAN), camera serial interface (CSI-2), or similar interface. Limitations to the bandwidth of these interfaces can also be considered when determining how to configure compression block 304 to compress radar data.

As noted, some algorithms for processing radar data (e.g., for object identification, positioning, etc.) may use a fixed number of input data points. Thus, according to some embodiments, if the compression technique(s) utilized by the compression block 304 do not yield the desired fixed number of points for the processing algorithm, different strategies may be used to add or drop data points in the radar data. For example, according to some embodiments, radar data may be dropped or added based on a priority. For example, information regarding nearby objects may be more critical for the operation of a vehicle, and thus, radar data related to nearby objects may be preserved (and/or data may be added, such as adding neighboring information to detected objects), while information regarding distant objects may be dropped. One way of implement and this is by dropping information beyond a given range if a fixed number of data points is exceeded, until the fixed number is met. If there is insufficient data to meet the fixed number, embodiments may randomly add a number of points if the compressed points are below a desired threshold, add neighboring information for data points above a threshold, and/or the like. (Adding neighboring information can also include determining a neighborhood size to meet the desired fixed number of data points.) Additionally or alternatively, the compression block 304 can employ an adaptive threshold to achieve the desired set of points.

Figure 4:
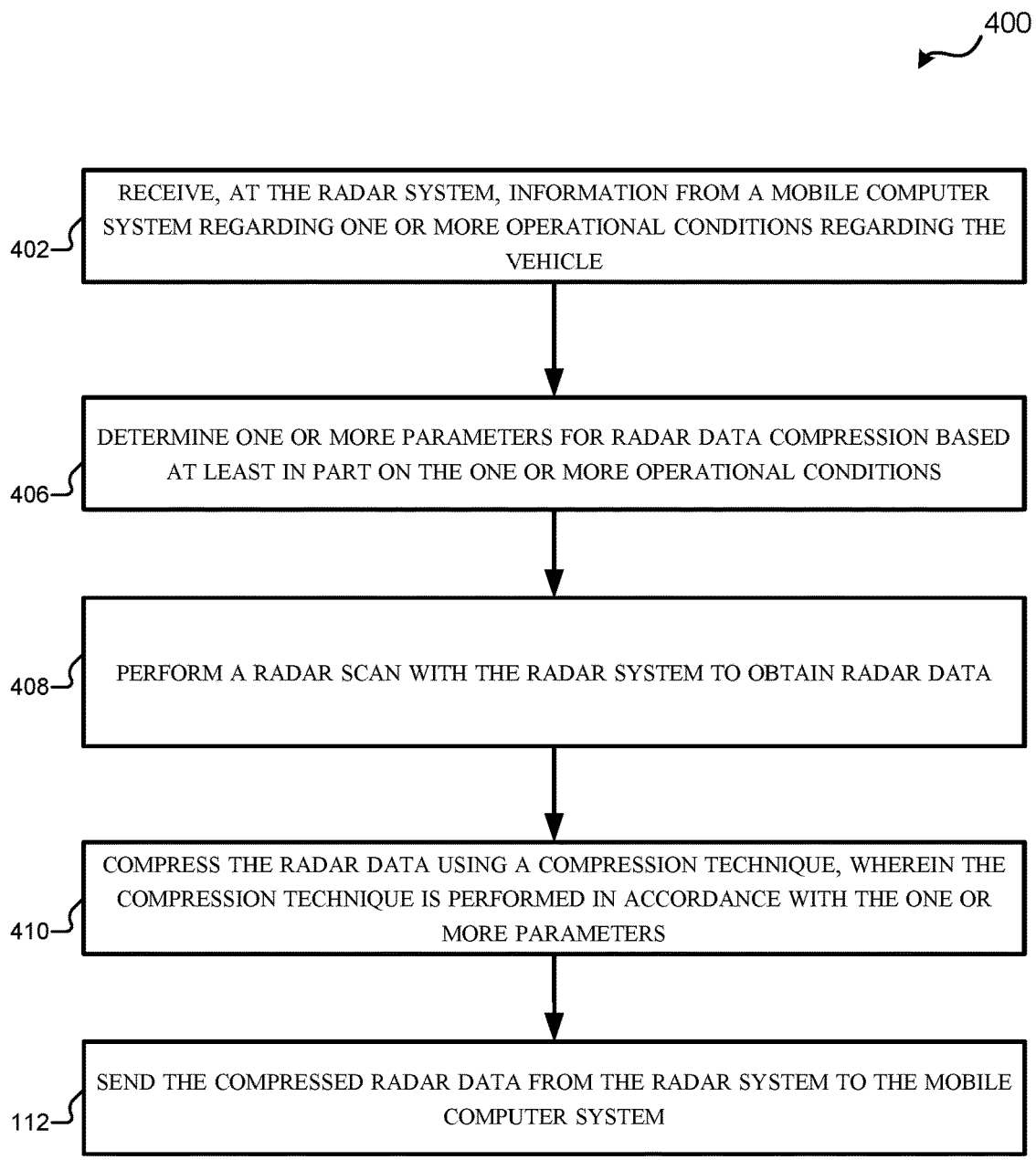
FIG. 4 is a flow diagram of a method of compressing radar data in a radar system of a vehicle, according to an embodiment.

FIG. 4 is a flow diagram of a method 400 of compressing radar data in a radar system of a vehicle, according to an embodiment. The method 400 captures aspects of the functionality described in the embodiments above and illustrated in FIGS. 1-3. One or more of the functions described in the blocks illustrated in FIG. 4 may be performed by software and/or hardware components, such as one or more components of the radar system 100 of FIG. 1 (including edge computing device 106), or, more generally, one or more components of the electronic device 500 illustrated in FIG. 5 and described below. Moreover, a person of ordinary skill in the art will appreciate that alternative embodiments may vary in the way they implement the functions illustrated in FIG. 4 by adding, omitting, combining, separating, and otherwise varying the functions illustrated in the blocks of FIG. 4.

At block 402, the functionality comprises receiving, at the radar system, information from a mobile computer system regarding one or more operational conditions regarding the vehicle. Here, an operational condition may comprise any condition impacting the functionality of the vehicle or radar system. As described herein in the embodiments above, this may comprise traffic condition, a weather condition, a detected or anticipated processing capability of the mobile computer system (e.g., central computer 108), an indication of closed-loop compression feedback (e.g., as previously described in relation to FIG. 3), and available bandwidth, and operating mode for the radar system (e.g., short range, midrange, long-range scanning modes, etc.), a desired accuracy (e.g., desired resolution or compression rate), and/or other information that can impact the selection of parameters for radar data compression as described herein.

According to some embodiments, an operational condition comprising a traffic condition or scenario may include whether rural (e.g., highway) conditions or urban (e.g., city) conditions exist. As noted, rural conditions may involve fewer objects near the vehicle, and may therefore utilize increased compression (resulting in lower resolution). Urban conditions, on the other hand, may utilize less compression due to the increased number of vehicles and increased risk for collisions. According to some embodiments, rather than a binary rural/urban designation, a traffic condition may be indicated by a scale or other indicator, allowing for a broader range of traffic designations (e.g., a numerical scale ranging from sparse/rural to dense/urban).

To provide the traffic condition, a mobile computer system of the vehicle may obtain relevant information via one or more different sensors. Other in vehicle sensors such as navigation system inputs (e.g., a Global Navigation Satellite System (GNSS) sensor) can determine if the vehicle is operating in urban or rural areas. In some embodiments, other advanced sensors (e.g., Light Detection and Ranging (LIDAR) sensors, electro-optical cameras), can provide an indication if the traffic density is increased to indicate urban driving conditions or sparse to indicate rural driving conditions. Additionally or alternatively, according to some embodiments, vehicle speed information can be used to determine if the vehicle is operating in under urban or rural driving conditions. For example, higher sustained speeds are indicative of highway (rural) driving conditions. Lower speeds, and stop and go traffic, can be indicative of urban driving conditions. According to some embodiments, a brake sensor can be used to determine if the vehicle is operating in urban or rural driving conditions. For example, in urban conditions the brake system is used more frequently than during rural (e.g., highway) conditions.

According to some embodiments, a traffic condition may be determined by the vehicle's mobile computer system from Vehicle-to-everything (V2X) information. V2X is a communication standard for vehicles and related entities to exchange information regarding a traffic environment. V2X messages can be sent and received by V2X-equipped vehicles. V2X can include vehicle-to-vehicle (V2V) communication between V2X-capable vehicles, vehicle-to-infrastructure (V21) communication between the vehicle and infrastructure-based devices (commonly-termed road-side units (RSUs)), vehicle-to-person (V2P) communication between vehicles and nearby people (pedestrians, cyclists, and other road users), and the like. Further, V2X can use any of a variety of wireless radio frequency (RF) communication technologies. Cellular V2X (CV2X), for example, is a form of V2X that uses cellular-based communication such as long-term evolution (LTE), fifth generation new radio (5G NR), and/or other cellular technologies (e.g., 6G and beyond) in a direct-communication mode as defined by the 3rd Generation Partnership Project (3GPP). A component or device on a vehicle, roadside units (RS U), or other V2X entity that is used to communicate V2X messages is generically referred to as a V2X device or V2X user equipment (UE). V2X messages can include traffic information, to include speed and position of other vehicles. Therefore, V2X messages can be a source of traffic information a mobile computer system may use to determine a traffic edition to provide to the radar system, according to some embodiments.

An operational condition comprising a weather condition may indicate precipitation and/or other weather that may impact the functionality of radar, and, according to some embodiments, it may impact a compression block may be configured to compressed radar data. Adverse weather (e.g., snow or rain) may also be related to a traffic edition in that it may produce high-density traffic conditions that are akin to urban driving conditions. Rain or ice sensors on vehicles can, V2X information messages, information accessed via the Internet, and other sources may provide information from which a weather condition may be determined by a mobile computer system.

Means for performing the functionality at block 402 can include, for example, a DSP 110, a microcontroller 112, one or more interfaces 114, and/or other components of an edge computing device 106 of a radar system 100 as illustrated in FIG. 1.

At block 406, the method 400 comprises determining one or more parameters for radar data compression based at least in part on the one or more operational conditions. As noted in the embodiments described above, a compression block (e.g., block 204 of FIG. 2 and block 304 of FIG. 3) may be configured using one or more parameters related to radar data compression. Different radar data compression techniques may include different parameters. Dimensional collapse, for example, may include a parameter for identifying a dimension to collapse and a bin to use. Sampling techniques and statistic-based techniques may use thresholds, percentiles, and/or other values as parameters. CFAR and neighborhood inclusion techniques may include intensity thresholds and/or neighboring block designations. Parameters for video compression techniques may include a bit rate (sample rate), resolution, or the like.

According to some embodiments, the compression technique itself may be determined or selected based on the one or more operational conditions regarding the vehicle. Different deep learning algorithms, for example, may be better at processing radar data under different conditions (e.g., rural versus urban conditions, high-resolution versus low-resolution conditions, etc.).

Means for performing the functionality at block 406 can include, for example, a DSP 110, a microcontroller 112, one or more interfaces 114, and/or other components of an edge computing device 106 of a radar system 100 as illustrated in FIG. 1.

At block 408, method 400 comprises performing a radar scan with the radar system to obtain radar data. As noted with regard to FIG. 1, a radar scan of a volume (e.g., range, azimuth, and elevation) may be performed by a radar system by transmitting and receiving radar (RF) signals along certain directions. Doppler additionally may be obtained, according to some embodiments. Radar signals can be received as an analog signal and converted to a digital signal by RF front end circuitry (e.g., an antenna module and transceiver), and intensity values of these signals can be processed as radar data. The digital signal can be represented by a series of bins, wherein each bin represented the energy or intensity value for a dimension of the radar return signal. The dimensions can include range, azimuth, elevation, and Doppler.

Means for performing the functionality at block 408 can include, for example, a DSP 110, a microcontroller 112, one or more interfaces 114, and/or other components of an edge computing device 106 of a radar system 100 as illustrated in FIG. 1.

At block 410, the method 400 comprises compressing the radar data using a compression technique, wherein the compression technique is performed in accordance with the one or more parameters. As noted in the embodiments described above with regard to FIGS. 2-3, one or more of a variety of compression techniques may be used (e.g., by a compression block) to compress the radar data. Moreover, as further noted, parameters may be dependent on the type of compression technique(s) used. According to some embodiments, the compression technique may comprise dimensional collapse of one dimension of the radar data comprising a plurality of dimensions. In such embodiments, the plurality of dimensions of radar data can include two or more of a range, azimuth, elevation, or Doppler.

As noted, additional or alternative compression techniques may be used. According to some embodiments, the compression technique may comprise determining one or more regions of interest within a scanning volume of the radar system, identifying one or more portions of the radar data corresponding to the one or more regions of interest, and excluding, from the compressed radar data, radar data not corresponding to the identified one or more portions of the radar data. In such embodiments, the one or more parameters comprise information indicative of the one or more regions of interest. Additionally or alternatively, the compression technique may comprise excluding, from the compressed radar data, values that fail to meet a threshold intensity value, a threshold Signal-to-Noise Ratio (SNR) value, or a threshold Signal-to-Cluster-Noise Ratio (SCNR) value. In such embodiments, the one or more parameters may comprise the threshold intensity value, the threshold SNR value, or the threshold SCNR value. According to some embodiments, the compression technique may comprise determining a median intensity value of intensity values of at least a portion of the radar data, and excluding, from the compressed radar data, intensity values from the at least a portion of the radar data that are less than the median intensity value multiplied by a multiplier. In such embodiments, the one or more parameters comprise the multiplier. Further, according to some embodiments, the compression technique comprises a CFAR compression technique, a deep learning compression technique, or a video compression technique, or any combination thereof.

Means for performing the functionality at block 410 can include, for example, a DSP 110, a microcontroller 112, one or more interfaces 114, and/or other components of an edge computing device 106 of a radar system 100 as illustrated in FIG. 1.

At block 412, the method 400 comprises sending the compressed radar data from the radar system to the mobile computer system. The compressed data can be sent via a wired or wireless connection to the mobile computer system 108 as shown in FIG. 1. Means for performing the functionality at block 412 can include, for example, a DSP 110, a microcontroller 112, one or more interfaces 114, and/or other components of an edge computing device 106 of a radar system 100 as illustrated in FIG. 1.

Figure 5:
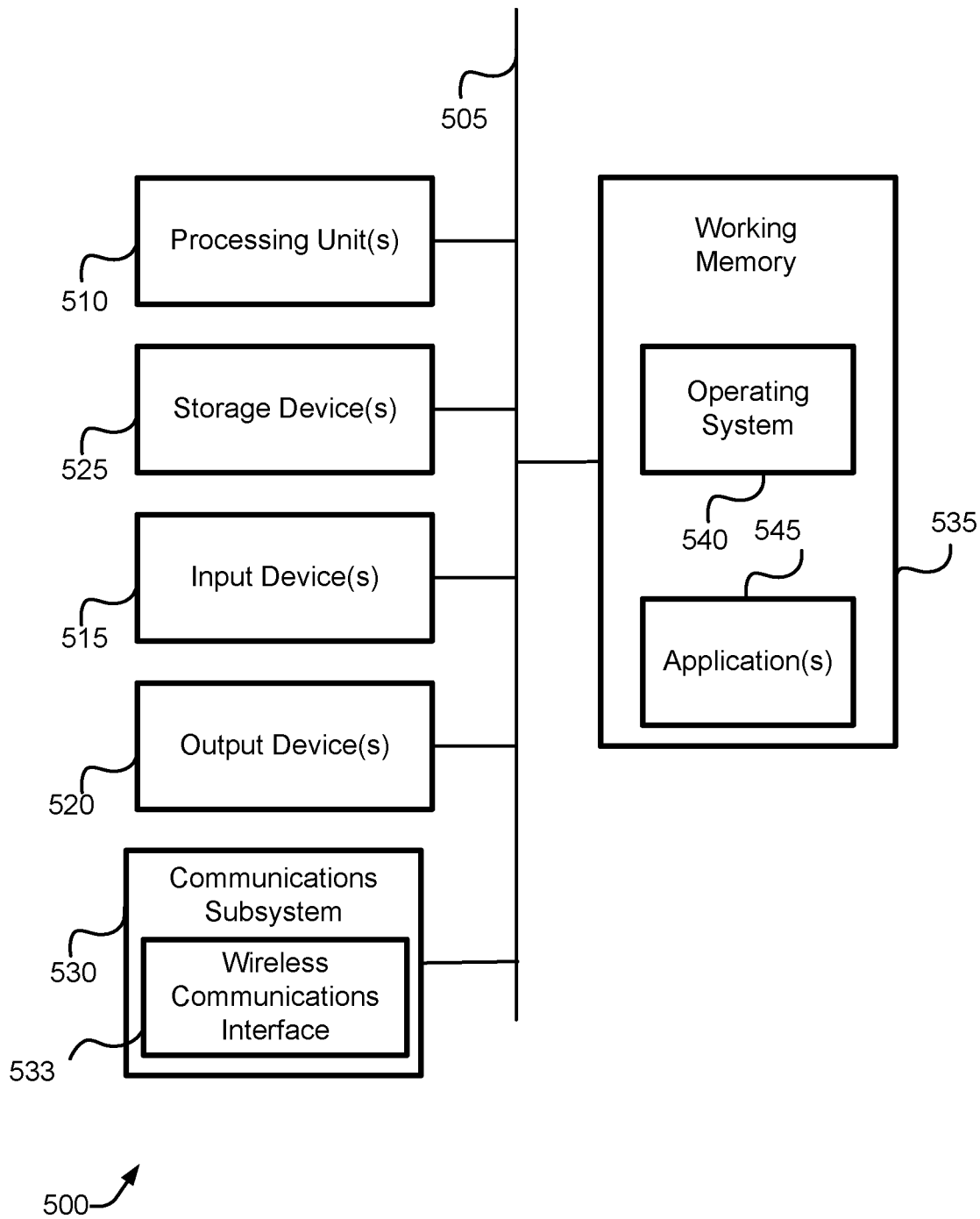
FIG. 5 is a block diagram of an electronic device, according to an embodiment.

FIG. 5 illustrates an embodiment of an electronic device 500 (e.g., a mobile computer system shown in FIG. 1), which may comprise or otherwise utilize a radar system capable of performing the techniques for radar data compression described herein. FIG. 5 provides a schematic illustration of one embodiment of an electronic device 500 that can perform the methods provided by various other embodiments, such as the methods described in FIG. 4.

It is noted that FIG. 5 is meant only to provide a generalized illustration of various components, any or all of which may be utilized as appropriate. FIG. 5, therefore, broadly illustrates how individual system elements may be implemented in a relatively separated or relatively more integrated manner. In addition, it can be noted that components illustrated by FIG. 5 can be localized to a single device and/or distributed among various networked devices, which may be disposed at different physical or geographical locations.

The electronic device 500 is shown comprising hardware elements that can be electrically coupled via a bus 505 (or may otherwise be in communication, as appropriate). The hardware elements may include processing unit(s) 510, which can include without limitation one or more general-purpose processors, one or more special-purpose processors (such as a Digital Signal Processor (DSP), Graphics Processing Unit (GPU), Application-Specific Integrated Circuit (ASIC), Field-Programmable Gate Array (FPGA), and/or the like), and/or other processing structure, which can be configured to perform one or more of the methods described herein, including the method described in relation to FIG. 5. The electronic device 500 also can include one or more input devices 515, which can include without limitation a mouse, a keyboard, a camera, a microphone, and/or the like; and one or more output devices 520, which can include without limitation a display device, a printer, and/or the like.

The electronic device 500 may further include (and/or be in communication with) one or more non-transitory storage device(s) 525, which can comprise, without limitation, local and/or network accessible storage, and/or can include, without limitation, a disk drive, a drive array, an optical storage device, a solid-state storage device, such as a RAM, and/or a ROM, which can be programmable, flash-updateable, and/or the like. Such storage devices may be configured to implement any appropriate data stores, including without limitation, various file systems, database structures, and/or the like.

The electronic device 500 may also include a communications subsystem 530, which can include support of wireline communication technologies and/or wireless communication technologies (in some embodiments) managed and controlled by a wireless communication interface 533. The communications subsystem 530 may include a modem, a network card (wireless or wired), an infrared communication device, a wireless communication device, and/or a chipset, and/or the like. The communications subsystem 530 may include one or more input and/or output communication interfaces, such as the wireless communication interface 533, to permit data and signaling to be exchanged with a network, mobile devices, and/or other electronic devices. A radar sensor may be incorporated into a wireless communications interface 533 such that antenna elements in a transmitter antenna array (e.g. Tx antenna array) and receiver antenna array (e.g., Rx antenna array), and the circuitry connected with the antenna elements (e.g., mux and processing unit), may be used for both proximity detection and data communication. For example, in some embodiments, the wireless communication interface 533 may comprise an 802.11ad- and/or 802.11ay-compatible modem capable of both RF imaging and data communication. Institute of Electrical and Electronic Engineers (IEEE) 802.11ad is a wireless standard that uses the 60 Giga Hertz (GHz) spectrum instead of the 5 GHz and 2.4 GHz used by most Wi-Fi connections. IEEE 802.11ad boasts a theoretical max speed of 7 Gigabits per second (Gbps), vs 3.2 Gbps for 802.11ac Wave 2. IEEE 802.11ay is a type of wireless local area network (WLAN) in the IEEE 802.11 set of WLANs. It will have a frequency of 60 GHz, a transmission rate of 20-40 Gbps and an extended transmission distance of 300-500 meters. IEEE 802.11ay is a type of WLAN in the IEEE 802.11 set of WLANs. IEEE 802.11ay has a frequency of 60 GHz, a transmission rate of 20-40 Gbps and an extended transmission distance of 300-500 meters. Alternatively, a radar sensor and accompanying circuitry may be separate from the communications subsystem 530. In such embodiments, the radar sensor may be utilized as an input device 515.

In many embodiments, the electronic device 500 will further comprise a working memory 535, which can include a RAM and/or or ROM device. Software elements, shown as being located within the working memory 535, can include an operating system 540, device drivers, executable libraries, and/or other code, such as application(s) 545, which may comprise computer programs provided by various embodiments, and/or may be designed to implement methods, and/or configure systems, provided by other embodiments, as described herein. Merely by way of example, one or more procedures described with respect to the method(s) discussed above, such as the method described in relation to FIG. 4, may be implemented as code and/or instructions that are stored (e.g. temporarily) in working memory 535 and are executable by a computer (and/or a processing unit within a computer such as processing unit(s) 510); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 525 described above. In some cases, the storage medium might be incorporated within a computer system, such as electronic device 500. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 500 and/or might take the form of source and/or installable code, which, upon compilation and/or installation on the electronic device 500 (e.g., using any of a variety of generally available compilers, installation programs, compression/decompression utilities, etc.), then takes the form of executable code.

It can be noted that, although particular frequencies, integrated circuit (IC), hardware, and other features are described in the embodiments herein, alternative embodiments may vary. That is, alternative embodiments may utilize additional or alternative frequencies (e.g., other the 60 GHz and/or 28 GHz frequency bands, or even outside mm Wave frequencies (30 GHz to 300 GHz), antenna elements (e.g., having different size/shape of antenna element arrays), scanning periods (including both static and dynamic scanning periods), electronic devices (e.g., mobile phones, tablets, personal computer (PC), etc.), and/or other features. A person of ordinary skill in the art will appreciate such variations.

Figure 6:
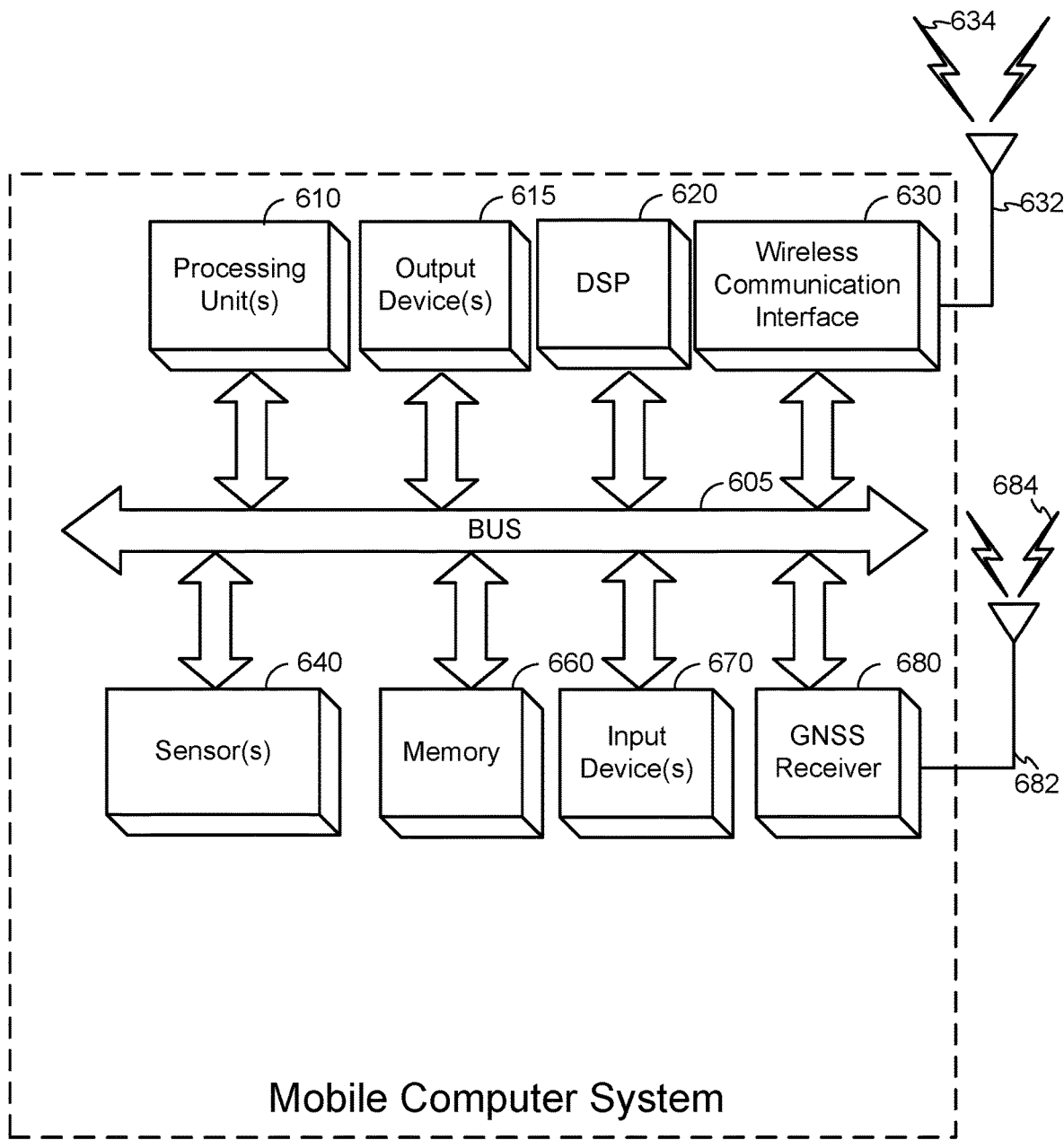
FIG. 6 is a block diagram of an embodiment of a mobile computer system.

FIG. 6 illustrates an embodiment of a mobile computer system 600, which may be utilized as described herein above. For example, the mobile computer system 600 may be utilized on a vehicle and may therefore corresponds to a central computer (e.g., central computer 108 of FIG. 1). The mobile computer system 600 may be used as described in the embodiments herein, including gathering sensor information from radar sensors and (optionally) other sensors, processing sensor data, and determining and performing vehicle maneuvers and/or other operations based on sensor data. It should be noted that FIG. 6 is meant only to provide a generalized illustration of various components, any or all of which may be utilized as appropriate. It can be noted that, in some instances, components illustrated by FIG. 6 can be localized to a single physical device and/or distributed among various networked devices, which may be disposed at different physical locations on a vehicle.

The mobile computer system 600 is shown comprising hardware elements that can be electrically coupled via a bus 605 (or may otherwise be in communication, as appropriate). The hardware elements may include a processing unit(s) 610 which can include without limitation one or more general-purpose processors, one or more special-purpose processors (such as digital signal processing (DSP) chips, graphics acceleration processors, application specific integrated circuits (ASICs), and/or the like), and/or other processing structure or means. As shown in FIG. 6, some embodiments may have a DSP 620, depending on desired functionality. Sensor calibration and/or processing of calibration information and/or sensor measurement information may be provided in the processing unit(s) 610. The processing can occur across a plurality of components (e.g., a DSP 620, one or more processing unit(s) 610, a graphics-processing unit (GPU), and/or other dedicated hardware.)

The mobile computer system 600 also can include one or more input devices 670, which can include devices related to user interface (e.g., a touch screen, touch pad, microphone, button(s), dial(s), switch(es), and/or the like) and/or devices related to navigation, automated driving, and the like. Similarly, the one or more output devices 615 may be related to interacting with a user (e.g., via a display, light emitting diode(s) (LED(s)), speaker(s), etc.), and/or devices related to navigation, automated driving, and the like.

The mobile computer system 600 may also include a wireless communication interface 630, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device and/or various cellular devices, etc.), and/or the like, which may enable the mobile computer system 600 to communicate to other traffic entities (e.g., RSUs, other vehicles, etc.) via V2X and/or other communication standards. The communication can be carried out via one or more wireless communication antenna(s) 632 that send and/or receive wireless signals 634.

The mobile computer system 600 can further include sensors 640. In the embodiments described above, this can include the sensor to be calibrated and/or one or more additional sensors for cross-calibration. Sensors 640 may comprise, without limitation, one or more accelerometers, gyroscopes, cameras, magnetometers, altimeters, microphones, proximity sensors, light sensors, barometers, radars, LIDARs, and the like. Sensors 640 may be used, for example, to determine certain real-time characteristics of the vehicle and nearby objects, such as location, velocity, acceleration, and the like.

Embodiments of the mobile computer system 600 may also include a GNSS receiver 680 capable of receiving signals 684 from one or more GNSS satellites using an antenna 682 (which could be the same as the one or more wireless communication antenna(s) 632). Positioning based on GNSS signal measurement can be utilized to determine a current location of the vehicle, which, as discussed above, may be used in sensor calibration as described herein. The GNSS receiver 680 can extract a position of the mobile computer system 600, using conventional techniques, from GNSS satellites of a GNSS system, such as Global Positioning System (GPS) and/or similar systems.

The mobile computer system 600 may further include and/or be in communication with a memory 660. The memory 660 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 660 of the mobile computer system 600 also can comprise software elements (not shown in FIG. 6), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 660 that are executable by the mobile computer system 600 (and/or processing unit(s) 610 or DSP 620 within mobile computer system 600). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a Programmable ROM (PROM), Erasable PROM (EPROM), a flash-EPROM, any other memory chip or cartridge, a carrier wave as described hereinafter, or any other medium from which a computer can read instructions and/or code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. In addition, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It will be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it is noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. In addition, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1: A method of compressing radar data in a radar system of a vehicle, the method, comprising:
receiving, at the radar system, information from a mobile computer system regarding one or more operational conditions regarding the vehicle;
determining one or more parameters for radar data compression based at least in part on the one or more environmental conditions;
performing a radar scan with the radar system to obtain radar data;
compressing the radar data using a compression technique, wherein the compression technique is performed in accordance with the one or more parameters; and
sending the compressed radar data from the radar system to the mobile computer system.

Clause 2: The method of clause 1, wherein the one or more operational conditions comprise:
a traffic condition,
a weather condition,
a detected or predicted processing capability of the mobile computer system,
an indication of closed-loop compression feedback,
an available bandwidth,
an operating mode for the radar system, or
a desired accuracy, or
any combination thereof.

Clause 3: The method of clauses 1 or 2, wherein the compression technique comprises dimensional collapse of one dimension of the radar data comprising a plurality of dimensions.

Clause 4: The method of clauses 1 or 2, wherein the compression technique comprises:
determining one or more regions of interest within a scanning volume of the radar system;
identifying one or more portions of the radar data corresponding to the one or more regions of interest; and
excluding, from the compressed radar data, radar data not corresponding to the identified one or more portions of the radar data.

Clause 5: The method of any of clauses 1-4, wherein the one or more parameters comprise information indicative of the one or more regions of interest.

Clause 6: The method of clauses 1, 2, or 5 wherein the compression technique comprises excluding, from the compressed radar data, values that fail to meet a threshold intensity value, a threshold Signal-to-Noise Ratio (SNR) value, or a threshold Signal-to-Cluster-Noise Ratio (SCNR) value.

Clause 7: The method of clause 6, wherein the one or more parameters comprise the threshold intensity value, the threshold SNR value, or the threshold SCNR value.

Clause 8: The method of clauses 1, 2, or 5, wherein the compression technique comprises:
determining a median intensity value of intensity values of at least a portion of the radar data; and
excluding, from the compressed radar data, intensity values from the at least a portion of the radar data that are less than the median intensity value multiplied by a multiplier.

Clause 9: The method of clause 8, wherein the one or more parameters comprise the multiplier.

Clause 10: The method of clauses 1, 2, or 5, wherein the compression technique comprises:
a constant false alarm rate (CFAR) compression technique,
a deep learning compression technique, or
a video compression technique, or
any combination thereof.

Clause 11: A device comprising:
a transceiver;
a memory; and
one or more processing units communicatively coupled with the transceiver and the memory, the one or more processing units configured to:
receive, via the transceiver, information from a mobile computer system regarding one or more operational conditions regarding a vehicle;
determine one or more parameters for radar data compression based at least in part on the one or more environmental conditions;
perform a radar scan with the transceiver to obtain radar data;
compress the radar data using a compression technique, wherein the compression technique is performed in accordance with the one or more parameters; and
send the compressed radar data from the device to the mobile computer system.

Clause 12: The device of clause 11, wherein the one or more operational conditions comprise:
a traffic condition,
a weather condition,
a detected or predicted processing capability of the mobile computer system,
an indication of closed-loop compression feedback,
an available bandwidth,
an operating mode for the device, or
a desired accuracy, or
any combination thereof.

Clause 13: The device of clauses 11 or 12, wherein, to compress the radar data using the compression technique, the one or more processing units are configured to perform dimensional collapse of one dimension of the radar data.

Clause 14: The device of clauses 11 or 12, wherein, to compress the radar data using the compression technique, the one or more processing units are configured to:
determine one or more regions of interest within a scanning volume of the device;
identify one or more portions of the radar data corresponding to the one or more regions of interest; and
exclude, from the compressed radar data, radar data not corresponding to the identified one or more portions of the radar data.

Clause 15: The device of any of clauses 11-14, wherein the one or more parameters comprise information indicative of the one or more regions of interest.

Clause 16: The device of clauses 11, 12, or 15, wherein, to compress the radar data using the compression technique, the one or more processing units are configured to exclude, from the compressed radar data, values that fail to meet a threshold intensity value, a threshold Signal-to-Noise Ratio (SNR) value, or a threshold Signal-to-Cluster-Noise Ratio (SCNR) value.

Clause 17: The device of clause 16, wherein the one or more parameters comprise the threshold intensity value, the threshold SNR value, or the threshold SCNR value.

Clause 18: The device of clauses 11, 12, or 15, wherein, to compress the radar data using the compression technique, the one or more processing units are configured to:
determine a median intensity value of intensity values of at least a portion of the radar data; and
exclude, from the compressed radar data, intensity values from the at least a portion of the radar data that are less than the median intensity value multiplied by a multiplier.

Clause 19: The device of clause 18, wherein the one or more parameters comprise the multiplier.

Clause 20: The device of clauses 11, 12, or 15, wherein, to compress the radar data using the compression technique, the one or more processing units are configured to perform:
a constant false alarm rate (CFAR) compression technique,
a deep learning compression technique, or
a video compression technique, or
any combination thereof.

Clause 21: A device comprising:
means for receiving information from a mobile computer system regarding one or more operational conditions regarding a vehicle;
means for determining one or more parameters for radar data compression based at least in part on the one or more environmental conditions;
means for performing a radar scan to obtain radar data;
means for compressing the radar data using a compression technique, wherein the compression technique is performed in accordance with the one or more parameters; and
means for sending the compressed radar data to the mobile computer system.

Clause 22: The device of clause 21, wherein the one or more operational conditions comprise:
a traffic condition,
a weather condition,
a detected or predicted processing capability of the mobile computer system,
an indication of closed-loop compression feedback,
an available bandwidth,
an operating mode for the device, or
a desired accuracy, or
any combination thereof.

Clause 23: The device of clauses 21 or 22, wherein the means for compressing the radar data using a compression technique comprise means for performing a dimensional collapse of one dimension of the radar data.

Clause 24: The device of clauses 21 or 22, wherein the means for compressing the radar data using a compression technique comprises:
means for determining one or more regions of interest within a scanning volume of the device;
means for identifying one or more portions of the radar data corresponding to the one or more regions of interest; and
means for excluding, from the compressed radar data, radar data not corresponding to the identified one or more portions of the radar data.

Clause 25: The device of any of clauses 21-24, wherein the one or more parameters comprise information indicative of the one or more regions of interest.

Clause 26: The device of clauses 21, 22, or 25, wherein the means for compressing the radar data using a compression technique comprises means for excluding, from the compressed radar data, values that fail to meet a threshold intensity value, a threshold Signal-to-Noise Ratio (SNR) value, or a threshold Signal-to-Cluster-Noise Ratio (SCNR) value.

Clause 27: The device of clause 26, wherein the one or more parameters comprise the threshold intensity value, the threshold SNR value, or the threshold SCNR value.

Clause 28: The device of clauses 21, 22, or 25, wherein the means for compressing the radar data using a compression technique comprises:
means for determining a median intensity value of intensity values of at least a portion of the radar data; and
means for excluding, from the compressed radar data, intensity values from the at least a portion of the radar data that are less than the median intensity value multiplied by a multiplier.

Clause 29: The device of clauses 21, 22, or 25, wherein the means for compressing the radar data using a compression technique comprises:
means for performing a constant false alarm rate (CFAR) compression technique,
means for performing a deep learning compression technique, or
means for performing a video compression technique, or
any combination thereof.

Clause 30: A non-transitory computer-readable medium storing instructions for compressing radar data in a radar system of a vehicle, the instructions comprising code for:

receiving, at the radar system, information from a mobile computer system regarding one or more operational conditions regarding the vehicle;

determining one or more parameters for radar data compression based at least in part on the one or more environmental conditions;

performing a radar scan with the radar system to obtain radar data;

compressing the radar data using a compression technique, wherein the compression technique is performed in accordance with the one or more parameters; and sending the compressed radar data from the radar system to the mobile computer system.

What is claimed is:

1. A method of compressing radar data in a radar system of a vehicle, the method comprising:

receiving, at the radar system, operational condition information from a mobile computer system regarding one or more operational conditions regarding the vehicle, wherein the operational condition information is obtained by the mobile computer system using at least one of data from one or more non-radar sensors of the vehicle or data received via communication with another device;

determining, from a plurality of compression modes of operation, a compression mode of operation for compressing the radar data at a particular compression level based at least in part on a likelihood of collision of the vehicle with at least one object indicated by the operational condition information, wherein the plurality of compression modes of operation are associated with at least a first compression technique having a first compression level and a second compression technique having a second compression level, the second compression technique being different from the first compression technique;

determining one or more parameters for radar data compression based at least in part on the compression mode;

performing a radar scan with the radar system to obtain the radar data;

compressing the radar data using a compression technique according to the compression mode, wherein the compression technique is performed in accordance with the one or more parameters; and sending the compressed radar data from the radar system to the mobile computer system.

2. The method of claim 1, wherein the one or more operational conditions comprise:
a traffic condition,
a weather condition,
a detected or predicted processing capability of the mobile computer system,
an indication of closed-loop compression feedback,
an available bandwidth,
an operating mode for the radar system, or
a desired accuracy, or
any combination thereof.

3. The method of claim 1, wherein the compression technique comprises dimensional collapse of one dimension of the radar data comprising a plurality of dimensions.

4. The method of claim 1, wherein the compression technique comprises:
determining one or more regions of interest within a scanning volume of the radar system;
identifying one or more portions of the radar data corresponding to the one or more regions of interest; and
excluding, from the compressed radar data, radar data not corresponding to the identified one or more portions of the radar data.

5. The method of claim 4, wherein the one or more parameters comprise information indicative of the one or more regions of interest.

6. The method of claim 1, wherein the compression technique comprises excluding, from the compressed radar data, values that fail to meet a threshold intensity value, a threshold Signal-to-Noise Ratio (SNR) value, or a threshold Signal-to-Cluster-Noise Ratio (SCNR) value.

7. The method of claim 6, wherein the one or more parameters comprise the threshold intensity value, the threshold SNR value, or the threshold SCNR value.

8. The method of claim 1, wherein the compression technique comprises:
determining a median intensity value of intensity values of at least a portion of the radar data; and
excluding, from the compressed radar data, intensity values from the at least a portion of the radar data that are less than the median intensity value multiplied by a multiplier.

9. The method of claim 8, wherein the one or more parameters comprise the multiplier.

10. The method of claim 1, wherein the compression technique comprises:
a constant false alarm rate (CFAR) compression technique,
a deep learning compression technique, or
a video compression technique, or
any combination thereof.

11. A device comprising:
a transceiver;
a memory; and
one or more processing units communicatively coupled with the transceiver and the memory, the one or more processing units configured to:
receive, via the transceiver, operational condition information from a mobile computer system regarding one or more operational conditions regarding a vehicle, wherein the operational condition information is obtained by the mobile computer system using at least one of data from one or more non-radar sensors of the vehicle or data received via communication with another device;
determine, from a plurality of compression modes of operation, a compression mode of operation for compressing radar data at a particular compression level based at least in part on a likelihood of collision of the vehicle with at least one object indicated by the operational condition information, wherein the plurality of compression modes of operation are associated with at least a first compression technique having a first compression level and a second compression technique having a second compression level, the second compression technique being different from the first compression technique;
determine one or more parameters for radar data compression based at least in part on the compression mode;
perform a radar scan with the transceiver to obtain the radar data;
compress the radar data using a compression technique according to the compression mode, wherein the compression technique is performed in accordance with the one or more parameters; and send the compressed radar data from the device to the mobile computer system.

12. The device of claim 11, wherein the one or more operational conditions comprise:
   a traffic condition,
   a weather condition,
   a detected or predicted processing capability of the mobile computer system,
   an indication of closed-loop compression feedback,
   an available bandwidth,
   an operating mode for the device, or
   a desired accuracy, or
   any combination thereof.

13. The device of claim 11, wherein, to compress the radar data using the compression technique, the one or more processing units are configured to perform dimensional collapse of one dimension of the radar data.

14. The device of claim 11, wherein, to compress the radar data using the compression technique, the one or more processing units are configured to:
   determine one or more regions of interest within a scanning volume of the device;
   identify one or more portions of the radar data corresponding to the one or more regions of interest; and
   exclude, from the compressed radar data, radar data not corresponding to the identified one or more portions of the radar data.

15. The device of claim 14, wherein the one or more parameters comprise information indicative of the one or more regions of interest.

16. The device of claim 11, wherein, to compress the radar data using the compression technique, the one or more processing units are configured to exclude, from the compressed radar data, values that fail to meet a threshold intensity value, a threshold Signal-to-Noise Ratio (SNR) value, or a threshold Signal-to-Cluster-Noise Ratio (SCNR) value.

17. The device of claim 16, wherein the one or more parameters comprise the threshold intensity value, the threshold SNR value, or the threshold SCNR value.

18. The device of claim 11, wherein, to compress the radar data using the compression technique, the one or more processing units are configured to:
   determine a median intensity value of intensity values of at least a portion of the radar data; and
   exclude, from the compressed radar data, intensity values from the at least a portion of the radar data that are less than the median intensity value multiplied by a multiplier.

19. The device of claim 18, wherein the one or more parameters comprise the multiplier.

20. The device of claim 11, wherein, to compress the radar data using the compression technique, the one or more processing units are configured to perform:
   a constant false alarm rate (CFAR) compression technique,
   a deep learning compression technique, or
   a video compression technique, or
   any combination thereof.

21. A device comprising:
   means for receiving operational condition information from a mobile computer system regarding one or more operational conditions regarding a vehicle, wherein the operational condition information is obtained by the mobile computer system using at least one of data from one or more non-radar sensors of the vehicle or data received via communication with another device;
   means for determining, from a plurality of compression modes of operation, a compression mode of operation for compressing radar data at a particular compression level based at least in part on a likelihood of collision of the vehicle with at least one object indicated by the operational condition information, wherein the plurality of compression modes of operation are associated with at least a first compression technique having a first compression level and a second compression technique having a second compression level, the second compression technique being different from the first compression technique;
   means for determining one or more parameters for radar data compression based at least in part on the compression mode;
   means for performing a radar scan to obtain the radar data;
   means for compressing the radar data using a compression technique according to the compression mode, wherein the compression technique is performed in accordance with the one or more parameters; and
   means for sending the compressed radar data to the mobile computer system.

22. The device of claim 21, wherein the one or more operational conditions comprise:
   a traffic condition,
   a weather condition,
   a detected or predicted processing capability of the mobile computer system,
   an indication of closed-loop compression feedback,
   an available bandwidth,
   an operating mode for the device, or
   a desired accuracy, or
   any combination thereof.

23. The device of claim 21, wherein the means for compressing the radar data using a compression technique comprise means for performing a dimensional collapse of one dimension of the radar data.

24. The device of claim 21, wherein the means for compressing the radar data using a compression technique comprises:
   means for determining one or more regions of interest within a scanning volume of the device;
   means for identifying one or more portions of the radar data corresponding to the one or more regions of interest; and
   means for excluding, from the compressed radar data, radar data not corresponding to the identified one or more portions of the radar data.

25. The device of claim 24, wherein the one or more parameters comprise information indicative of the one or more regions of interest.

26. The device of claim 21, wherein the means for compressing the radar data using a compression technique comprises means for excluding, from the compressed radar data, values that fail to meet a threshold intensity value, a threshold Signal-to-Noise Ratio (SNR) value, or a threshold Signal-to-Cluster-Noise Ratio (SCNR) value.

27. The device of claim 26, wherein the one or more parameters comprise the threshold intensity value, the threshold SNR value, or the threshold SCNR value.

28. The device of claim 21, wherein the means for compressing the radar data using a compression technique comprises:
   means for determining a median intensity value of intensity values of at least a portion of the radar data; and means for excluding, from the compressed radar data, intensity values from the at least a portion of the radar data that are less than the median intensity value multiplied by a multiplier.

29. The device of claim 21, wherein the means for compressing the radar data using a compression technique comprises:
   means for performing a constant false alarm rate (CFAR) compression technique,
   means for performing a deep learning compression technique, or
   means for performing a video compression technique, or any combination thereof.

30. A non-transitory computer-readable medium storing instructions for compressing radar data in a radar system of a vehicle, the instructions comprising code for:
   receiving, at the radar system, operational condition information from a mobile computer system regarding one or more operational conditions regarding the vehicle, wherein the operational condition information is obtained by the mobile computer system using at least one of data from one or more non-radar sensors of the vehicle or data received via communication with another device;
   determining, from a plurality of compression modes of operation, a compression mode of operation for compressing the radar data at a particular compression level based at least in part on a likelihood of collision of the vehicle with at least one object indicated by the operational condition information, wherein the plurality of compression modes of operation are associated with at least a first compression technique having a first compression level and a second compression technique having a second compression level, the second compression technique being different from the first compression technique;
   determining one or more parameters for radar data compression based at least in part on the compression mode;
   performing a radar scan with the radar system to obtain the radar data;
   compressing the radar data using a compression technique according to the compression mode, wherein the compression technique is performed in accordance with the one or more parameters; and
   sending the compressed radar data from the radar system to the mobile computer system.

* * * * *